United States Patent [19]
Jones

[11] Patent Number: 5,827,490
[45] Date of Patent: *Oct. 27, 1998

[54] METHOD FOR CONVERTING UREA TO AMMONIA

[75] Inventor: Dale Gordon Jones, Visalia, Calif.

[73] Assignee: Noell, Inc., Herndon, Va.

[*] Notice: The term of this patent shall not extend beyond the expiration date of Pat. No. 5,281,403.

[21] Appl. No.: 598,092

[22] Filed: Feb. 7, 1996

Related U.S. Application Data

[63] Continuation of Ser. No. 517,455, Aug. 21, 1995, abandoned, and Ser. No. 139,192, Oct. 19, 1993, abandoned, which is a division of Ser. No. 766,853, Sep. 27, 1991, Pat. No. 5,281,403.

[51] Int. Cl.$^6$ .............................. C01B 21/00; C01C 1/08
[52] U.S. Cl. ..................... 423/239.1; 423/246; 423/358
[58] Field of Search .................. 423/239.1, 246, 423/213.2, 358

[56] References Cited

U.S. PATENT DOCUMENTS

| | | | |
|---|---|---|---|
| 3,900,554 | 8/1975 | Lyon | 423/235 |
| 4,018,769 | 4/1977 | Young | 260/248 |
| 4,087,513 | 5/1978 | Schell | 423/437 |
| 4,124,629 | 11/1978 | Hansford | 260/449.6 M |
| 4,168,299 | 9/1979 | Schnell | 423/358 |
| 4,208,386 | 6/1980 | Arand et al. | 423/235 |
| 4,220,635 | 9/1980 | Schnell | 423/358 |
| 4,915,036 | 4/1990 | DeVita | 110/215 |
| 4,978,514 | 12/1990 | Hofmann et al. | 423/235 |
| 4,997,631 | 3/1991 | Hofmann et al. | 423/235 |
| 5,139,754 | 8/1992 | Luftglass et al. | 423/235 |
| 5,240,688 | 8/1993 | von Harpe et al. | 423/235 |

FOREIGN PATENT DOCUMENTS

| | | |
|---|---|---|
| 191528 | 7/1990 | Japan . |
| 2-191528 | 7/1990 | Japan . |
| WO9100134 | 1/1991 | WIPO . |

OTHER PUBLICATIONS

Article titled *Urea, Its Properties and Manufacture*, by George Tsei–Yu Chao, Library of Congress Catalog Card No. Ai–11254, 1967.

*Primary Examiner*—Wayne Langel
*Attorney, Agent, or Firm*—Christie, Parker & Hale, LLP

[57] ABSTRACT

A method for reducing $NO_x$ in a combustion exhaust gas stream from a boiler. The method includes the steps of converting an aqueous solution of urea to ammonia by heating the urea solution to a temperature of 350°–650° F. The urea solution is pressurized to the pressure required to keep urea solution is pressurized to the pressure required to keep urea reaction products in the liquid phase and is contacted for a selected time with a conversion catalyst selected from the group of metals, metal oxides, or metal compounds comprising aluminum, chromium, cobalt, molybdenum, niobium, titanium, tungsten, and vanadium to provide a converted area solution. The converted area solution is injected into the combustion exhaust gas for reducing $NO_x$.

18 Claims, 5 Drawing Sheets

Fig. 4
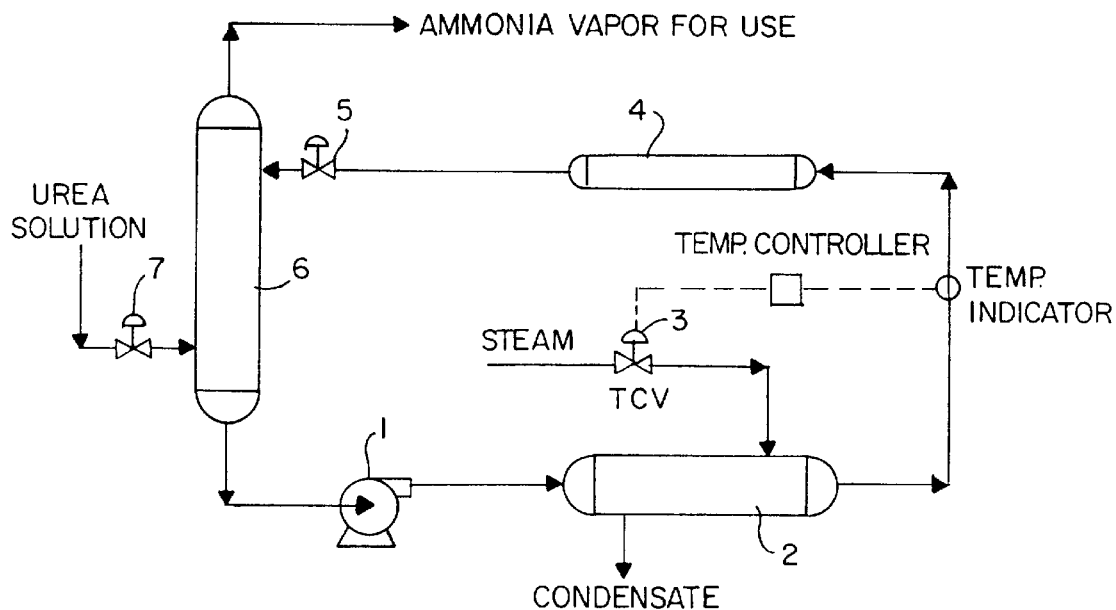
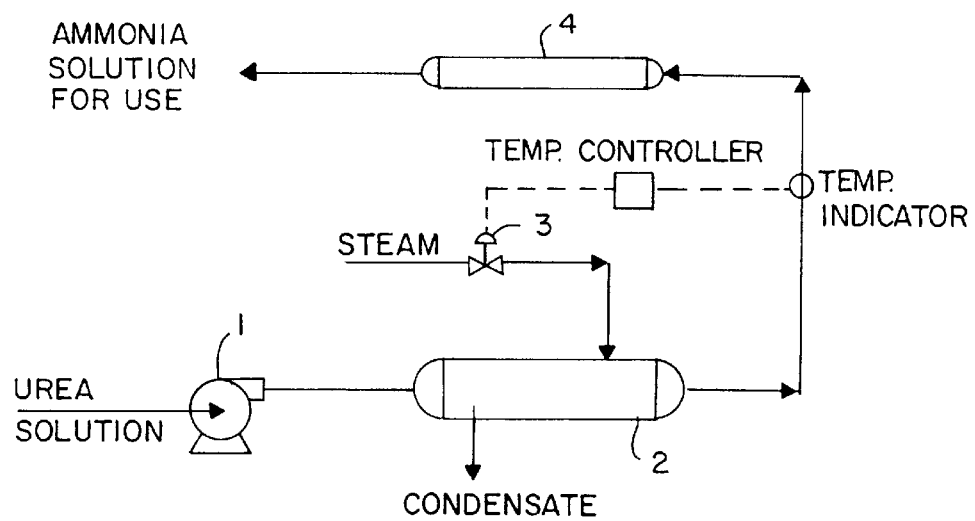

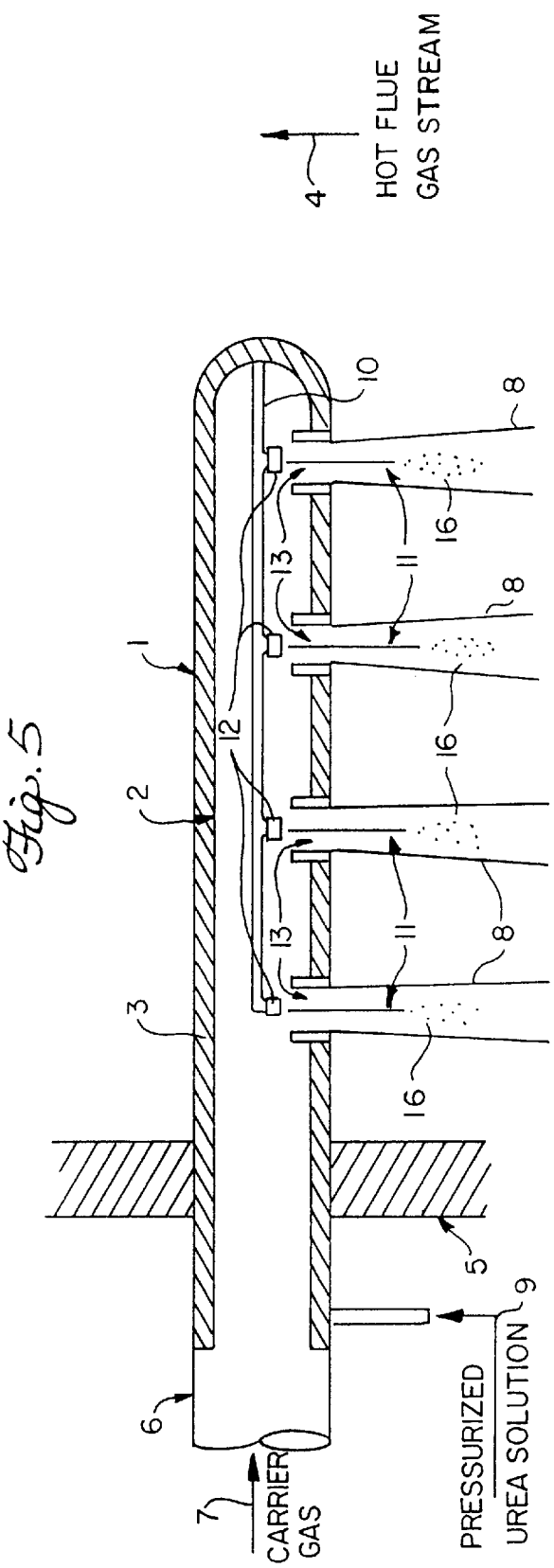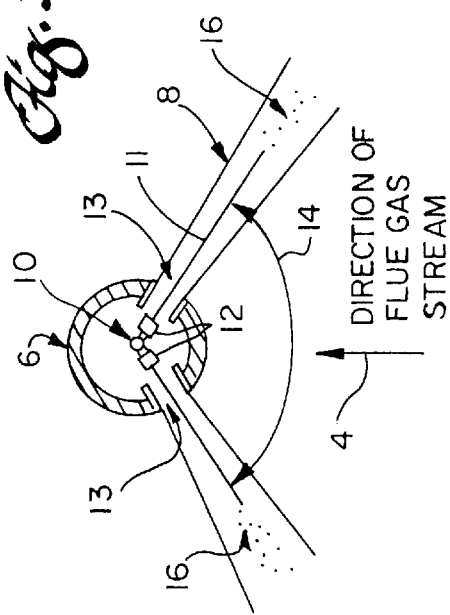

METHOD FOR CONVERTING UREA TO AMMONIA

CROSS-REFERENCE TO RELATED APPLICATIONS

This is a continuation of application Ser. No. 08/517,455, filed Aug. 21, 1995, abandoned, and is a continuation of application Ser. No. 08/139,192, filed Oct. 19, 1993, abandoned, which is a division of application Ser. No. 07/766,853, filed Sep. 27, 1991, U.S. Pat. No. 5,281,403.

FIELD OF THE INVENTION

This invention relates to techniques useful for utilizing catalytic materials to convert aqueous solutions of urea to ammonia, along with carbon dioxide byproduct. More particularly, this invention relates to techniques and systems involving means for introducing pressurized aqueous urea solution into a heating system, then converting the heated urea solution to ammonia for subsequent use by using catalyst materials selected from the group of metals, metal oxides, or metal compounds comprising aluminum, chromium, cobalt, molybdenum, niobium, titanium, tungsten, and vanadium. Specific embodiments include process configurations for using the converted urea to provide improved NOx reduction in combustion effluent gases from boilers, piston-driven engines and the like, either by direct injection for SNCR NOx reduction, or in combination with additional flue gas NOx reduction catalysts.

BACKGROUND OF THE INVENTION

Urea is a well-known fertilizer and industrial chemical which is useful for many purposes, including urea-formaldehyde resins and glues. Urea itself is a highly water-soluble salt, and is relatively easy to store, transport and handle. Urea does not have any perceptible odor and is not classified as a hazardous chemical. By contrast, ammonia or ammonia compounds give off a very strong ammonia odor in water solutions. Ammonia is classified as a hazardous chemical, and is much more difficult to store, transport and handle, compared with urea. However, in many cases, ammonia is preferred for use in chemical processes instead of urea, because of faster reaction times, fewer objectionable byproducts, and/or higher utilization efficiency. For example, in SNCR (Selective Non-Catalytic NOx Reduction) processes, which involve injecting a chemical such as ammonia or urea into NOx-containing flue gases at temperatures from 1600 to 2000 F., it has been determined that ammonia reacts more quickly than urea and produces lower concentrations of undesirable byproducts such as $N_2O$, CO, or $NH_3$ slip, compared with urea under otherwise identical SNCR process conditions. It is therefore desired to combine the advantages of both urea and ammonia into process systems utilizing ammonia.

One of the objectives of the present invention is to provide an effective and inexpensive means to use urea for storage, transportation, and handling as part of an ammonia process system. The present invention accomplishes this by rapid conversion of stored urea into ammonia for continuous use during long operational periods, whereby only very small amount(s) of ammonia are actually present in the equipment components of the ammonia process system. The cost and difficulty of providing storage, transportation, and handling of ammonia can therefore be avoided without sacrificing the performance benefits of using ammonia in the ammonia process system.

There are many examples which illustrate the advantages of the present invention. One such example might be for NOx control applications in large trucks powered by Diesel engines, where urea can be safely stored in the truck, but rapidly converted to ammonia at required flowrates for use in NOx control equipment to remove NOx pollution from the Diesel engine exhaust gas. It would be difficult to imagine that regulatory agencies would permit storage of ammonia (a hazardous chemical) in a large number of such trucks. In the event of a traffic accident, many innocent bystanders could be injured by ammonia fumes. However, odor-free and safely-stored urea chemical is not expected to present a difficult permitting problem for the same application. A reliable and inexpensive means for rapidly converting a given flowrate of aqueous urea into aqueous ammonia would provide a means for implementing this type of NOx control system into large trucks powered by Diesel engines. Other examples could be described, such as storage of urea for powerplant boiler NOx control systems, where aqueous urea is converted to aqueous ammonia prior to injection into the NOx-containing flue gas. As another example, the present invention could be used to provide rapid recovery of $NH_3$ and $CO_2$ from urea-containing water streams, as an improvement to urea manufacturing processes. Many other examples could also be cited.

A literature review indicates that no such rapid urea conversion process is commercially available. One of the best texts is "Urea, Its Properties and Manufacture" by G. Tsei-Yu Chao, Library of Congress Catalog Card No. Ai-11254, 1967. Chapter III-2 (Hydrolysis of Urea, pages 97–118) and Chapter III-7 (Miscellaneous Reactions of Urea, pages 177–194) make no mention of the use of catalysts to promote the conversion of urea. The text does show that 20% to 26% urea conversion (depending on addition of acids or alkalis) can be accomplished at 212 F. in 60 minutes residence time at atmospheric pressure. Such long reaction times with such low urea conversion percentages are not of interest.

Next, the U.S. Pat. Nos. of L. P. Schell (4,087,513 and 4,168,299 and 4,220,635) relating to urea hydrolysis were investigated. The '513 patent involves urea hydrolysis combined with absorption and condensation of mixtures of carbon dioxide and water vapor. The '299 (continuation) patent involves hydrolyzing urea to carbon dioxide and ammonia using vanadium pentoxide catalyst to achieve about 30% urea conversion at 215 F. in 30 minutes at atmospheric pressure. The '635 (continuation) patent shows the effectiveness of a variety of vanadium compounds. The best results were 58% urea conversion with 0.19% vanadium at about 220 F. in 360 minutes, and 100% urea conversion with 0.30% vanadium at the same temperature in 840 minutes. Both the '299 and '635 patents specify that reaction times of "at least 10 minutes, preferably about 15 to 60 (360) minutes, is desirable for most applications." One of the main objectives of the present invention is to achieve significant levels of urea conversion in less than 10 minutes reaction time.

Further investigation of urea manufacturing processes revealed the common practice of hydrolyzing urea contained in waste water streams to ammonia and $CO_2$ for recovery and re-use. This is accomplished by feeding a 1% or 2% aqueous urea solution at 300 psig into a steam-sparged reactor to achieve 99.9+% urea conversion at 400 F. in about 60 minutes reaction time. This is commonly practiced in urea manufacturing plants, and no catalyst is used. Again, the long reaction time which is required is a significant disadvantage.

Finally a search was conducted to determine if a catalyst to promote rapid urea conversion is taught in the prior art.

U.S. Pat. No. 4,124,629 describes urea hydrolysis which occurs in the presence of alumina and one or more of the iron group metals. In this case, co-precipitation of nickel and alumina from solution by urea hydrolysis was shown to produce a more stable catalyst than by prior methods. The discussion in Col 6, Example II indicates that with a large excess of catalyst at 210 F., "rapid evolution of $CO_2$ occurred due to urea hydrolysis . . . . After about 4 hours, the pH had risen from 2.3 to 4.5 . . . . Urea hydrolysis was allowed to continue, the pH rising to 5.3 in 85 more minutes, where it remained for about 2 hours . . . ." This teaching indicates that even with a large excess of catalyst, urea conversion reaction times are a matter of hours, not minutes. U.S. Pat. No. 4,018,769 entitled "Urea Cyanurate Manufacture" describes (at the top of Col 4) urea hydrolysis, where the effect of acid and temperature in mixtures of urea and elemental sulfur are said to accelerate reaction rates, with 90 C. to 150 C. (or 190 F. to 300 F.) being the upper limit of temperatures desired for urea cyanurate conversion, beyond which urea loss by hydrolysis exceeds acceptable limits. This teaching is consistent with the commercial practice of urea hydrolysis at 400 F. in 60 minutes, but it is not known whether the presence of elemental sulfur, as taught, hinders or helps the urea hydrolysis reaction rate. The present invention seeks to avoid the use of additional additives such as elemental sulfur.

It appears that neither prior art nor presently-practiced urea manufacturing processes utilize or anticipate the present invention using catalyst materials to achieve high percentages of urea conversion in very short reaction times.

SUMMARY OF THE INVENTION

This invention relates to methods used to convert urea to ammonia by heating a pressurized solution of aqueous urea, contacting said solution with a conversion catalyst selected from the group of metals, metal oxides, or metal compounds comprising aluminum, chromium, cobalt, molybdenum, niobium, titanium, tungsten, and vanadium. In order to convert substantially all the urea to ammonia (i.e. more than about 90%) in a reaction time of less than 10 minutes, the required temperature is from about 350 F. to 650 F. Specific embodiments include process configurations for once-through or loop-type ammonia recovery systems, conventional heaters or flue gas heat recovery systems, retractable flue gas lance systems, and applications for using converted urea in NOx reduction systems. These include providing improved NOx reduction in combustion effluent gases from boilers, piston-driven engines and the like, either by direct injection for SNCR NOx reduction, or in combination with additional flue gas NOx reduction catalysts.

BRIEF DESCRIPTION OF THE DRAWINGS

FIG. 4 Once-Through versus Loop-Type Ammonia Recovery Systems

FIGS. 5 and 5a Advanced Retractable Injection Lance System Application

DETAILED DESCRIPTION

Figure 1:
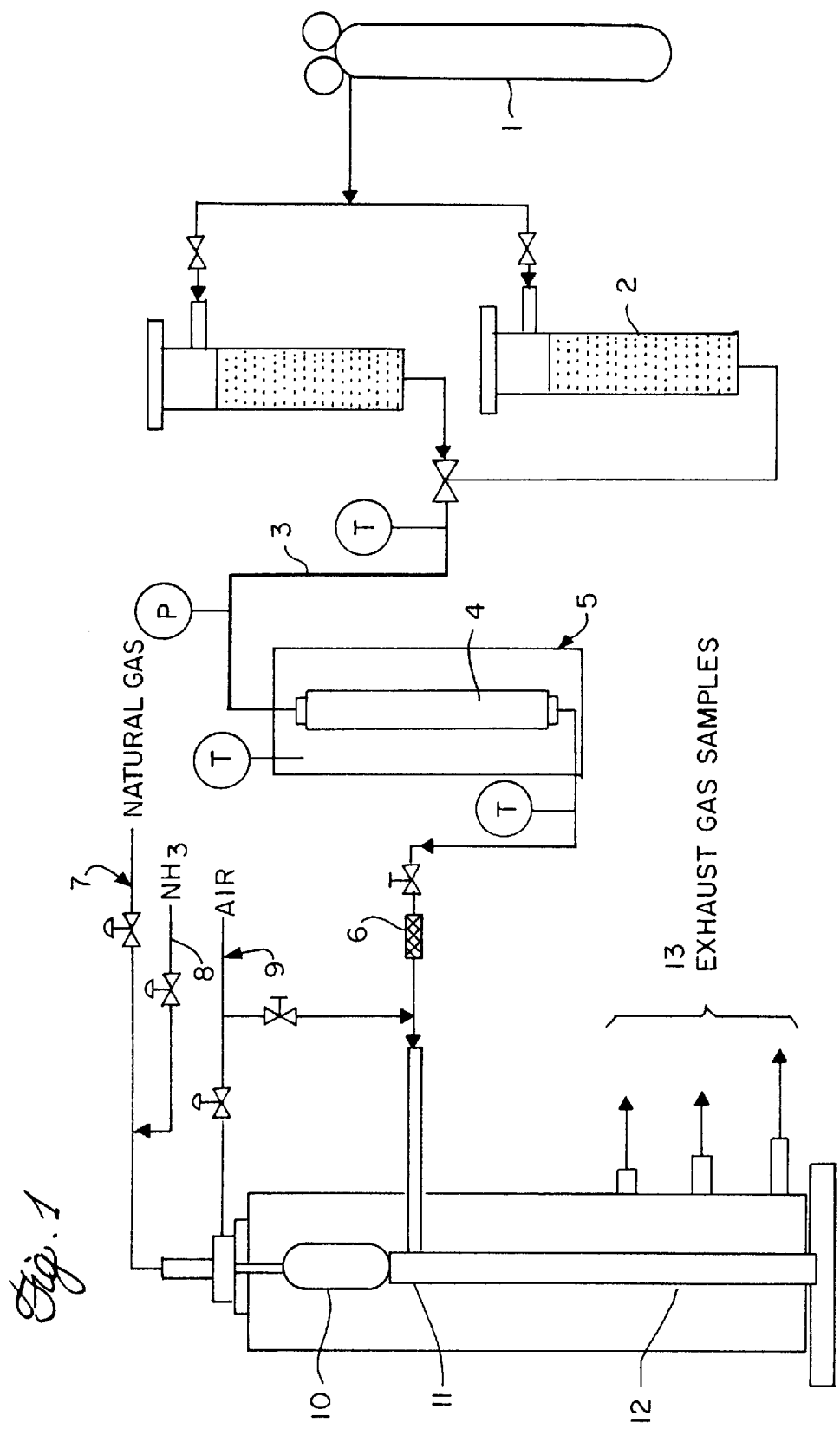
FIG. 1 Laboratory Combustor Facility

The present invention includes the use of conversion catalysts at elevated pressures and temperatures to accelerate urea hydrolysis. Urea hydrolysis is understood to comprise two (2) steps, as follows:

Step 1: Urea plus water yields ammonium carbamate

Step 2: Ammonium carbamate plus water yields ammonium carbonate

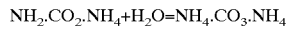

The disassociation of ammonium carbonate into two (2) molecules of $NH_3$ plus one (1) molecule each of $H_2O$ and $CO_2$ is well known. Therefore, conversion of urea to ammonium carbonate by two (2) hydrolysis steps is understood to be equivalent to converting urea to ammonia and byproduct carbon dioxide. The disassociation of ammonium carbamate into two (2) molecules of $NH_3$ plus one (1) molecule of $CO_2$ is also well known, and is nearly irreversible at reaction temperatures in excess of 250 F., as in the present invention. Therefore, it can be easily seen that urea conversion to ammonia by Step 1, above, should proceed faster if additional hydrolysis according to Step 2 is not required. The present invention only requires that Step 1 be accomplished. Any additional hydrolysis according to Step 2 may occur but is not required. Therefore, conversion of urea to ammonium carbamate by one (1) hydrolysis step at temperatures in excess of 250 F. is also understood to be equivalent to converting urea to ammonia and byproduct carbon dioxide.

The importance of this distinction was proven in laboratory combustor tests, conducted to determine the relative SNCR DeNOx effectiveness of urea, ammonium carbamate and ammonium hydroxide under otherwise identical conditions. It should be noted that similar tests comparing ammonium hydroxide and ammonium carbonate produced identical results under identical test conditions. The results are presented in Example I, below, which show that whenever urea is converted to either the carbamate or hydroxide forms of ammonia, such conversion is easily distinguished in SNCR DeNOx processes by reductions in byproduct $N_2O$ and significantly less increased CO:

EXAMPLE I

Laboratory Combustor Test Results

Test Conditions

Initial NOx=200 ppmv

Initial CO=23 ppmv

Flue Gas Temperature=1920 F.

Reaction Residence Time=500 msec

Flue Gas Cooling Rate=450 F./sec

Chemical Flowrate (NSR)=2.0

| Injection Chemical Name | Urea | Carbamate | Ammonia |
| --- | --- | --- | --- |
| Chemical Formula | $NH_2.CO.NH_2$ | $NH_2.CO_2.NH_4$ | $NH_4OH$ |
| Percentage $NO_x$ Reduction | 38% | 47% | 68% |
| Byproduct $N_2O/NO_x$ Ratio | 12.0% | 1.0% | 3.0% |
| Increased $CO/NO_x$ Ratio | +8.5% | +1.0% | +1.0% |

NOTE: Normalized Stoichiometric Ratio (NSR) is the molar ratio of injected nitrogen (N), divided by initial NOx, or NSR=(N/NOx)

It should be noted that the higher percentage NOx reduction achieved by the ammonium hydroxide is believed to be an artifact of the laboratory apparatus caused primarily by faster release of SNCR-active radicals from the hydroxide, as compared with either urea or carbamate. In larger-scale equipment, the effect of chemical composition on NOx reduction at fixed SNCR DeNOx process conditions is of much less significance. It is most important to note that both the hydroxide and carbamate forms of ammonia produce significantly less byproduct $N_2O$ and less increased CO compared with urea. Therefore, one important feature of the present invention is that it is only necessary to convert the urea to the carbamate form at temperatures in excess of 250 F., which for practical purposes is equivalent to converting urea to ammonia.

The laboratory combustor facility used for part of the evaluation of the present invention is shown schematically in FIG. 1. Referring now to FIG. 1, a high pressure nitrogen gas cylinder 1 is used to pressurize aqueous solutions of urea held in containers 2. The pressurized aqueous urea solution passes into heated pipe 3 and into the conversion catalyst 4, contained in an ordinary pipe and positioned inside a heated oven 5. Suitable pressure and temperature sensors are used to determine the pressure and temperature of the urea solution before and after the conversion catalyst 4. After passing through the conversion catalyst, the reacted solution passes through a liquid filter 6 and into a capillary tube used to control the backpressure and flowrate of the urea solution. If the capillary tube is lengthened, the pressure can be increased to maintain the same urea solution flowrate, or if the pressure is held constant, the flowrate will be reduced. The urea solution flowrates were thus varied between 1.0 and 2.0 liters/hour at liquid pressures from 300 psig to 2000 psig. The converted urea solutions passing through liquid filter 6 are injected into the injection zone 11 through a liquid capillary tube and a small air atomizing section, fabricated into a water-cooled holder, located at the center of the injection zone 11 throat, with the atomized spray directed downward (i.e. co-flowing with the combustion exhaust gas).

Natural gas fuel 7 and combustion air 9 are supplied using suitable pipelines to a burning chamber 10 positioned at the top of an insulated combustion exhaust gas tunnel 12. The refractory-lined combustion exhaust gas tunnel is 6 inches in diameter by 94 inches long. Combustion exhaust gas flowrates used for the tests referenced herein were nominally 50 DSCFM, corresponding to a maximum test section residence time of 500 milliseconds and test section temperature drop of 450 F./second. Ammonia gas 8 is premixed at an adjustable flowrate into the natural gas fuel 7 to provide an initial NOx concentration in the combustion tunnel exhaust gas at a given level. The flowrates of natural gas 7 and combustion air 9 can also be adjusted to provide a desired exhaust gas temperature at the injection zone 11. Combustion exhaust gas samples 13 are extracted from the sidewall of the insulated combustion exhaust gas tunnel 12 at desired location(s) which correspond to desired reaction time(s) in the high temperature environment.

The laboratory combustor facility also includes a significant amount of flue gas conditioning and analyzing equipment (not shown) which is utilized for measuring dried exhaust gas concentrations of NO, $N_2O$, $NO_2$, CO, $CO_2$, $NH_3$, and $O_2$. Obtaining such measurements at a variety of different SNCR DeNOx process operational conditions is useful for evaluating a variety of processes. In the configuration as shown in FIG. 1, the laboratory combustor facility was used to evaluate the urea conversion process of the present invention.

Figure 2:
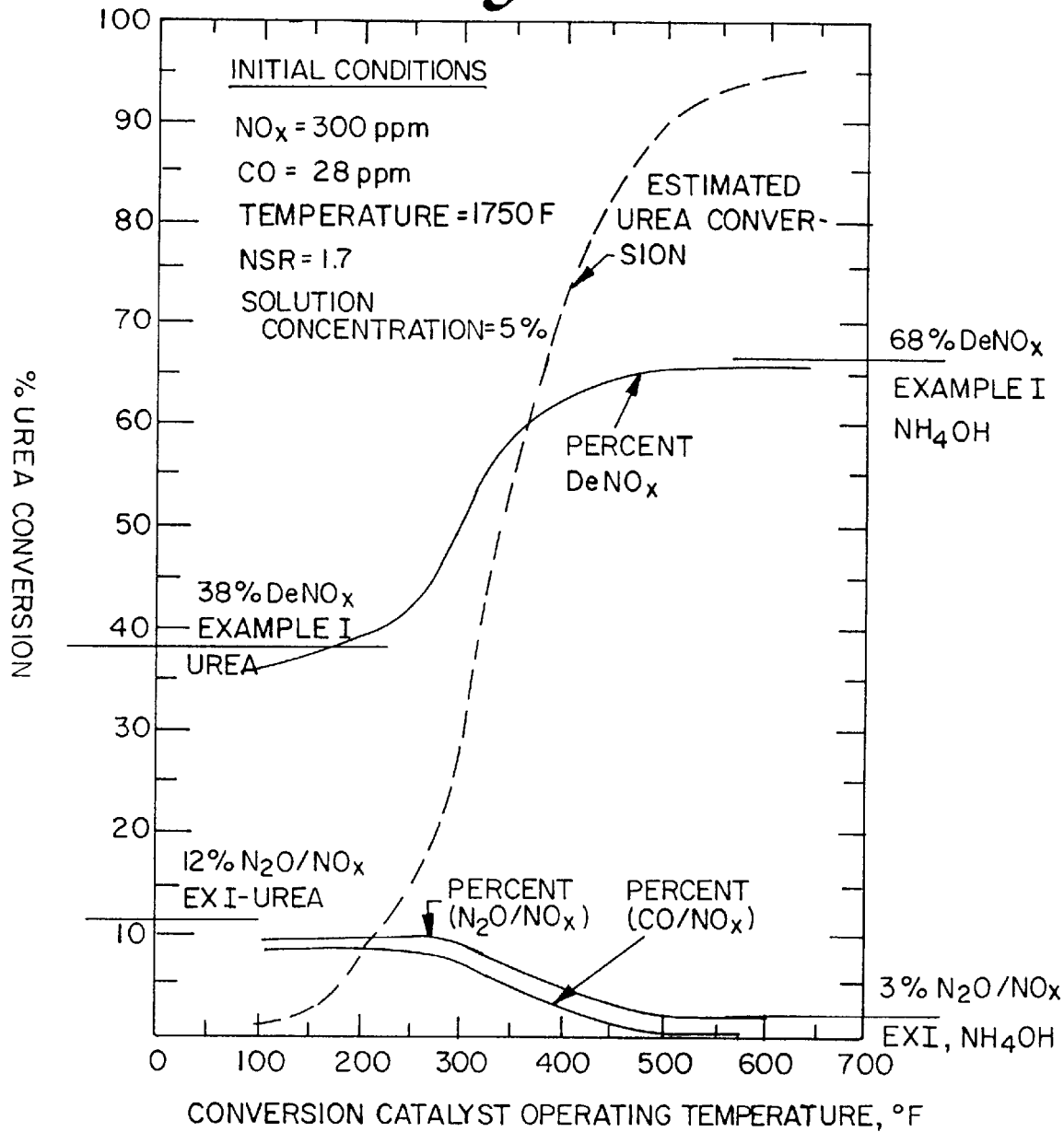
FIG. 2 Effect of Temperature on Urea Conversion

Laboratory combustor tests were conducted using a conversion catalyst containing molybdenum supported on an alumina substrate. The data from these tests is shown in FIG. 2. Referring now to FIG. 2, the data shows the same parameters as in Example 1, percentage Nox removal, percentage byproduct $N_2O$/NOx, and percentage increased CO/NOx, as a function of conversion catalyst operating temperature. FIG. 2 shows urea conversion percentage increasing from about 10% at 250 F. to over 90% at 500 F. under test conditions with conversion catalyst reaction time= 4.5 minutes, urea solution concentration=5%, initial NOx= 300 ppm, initial CO=28 ppm, flue gas temperature=1750 F., and chemical flowrate (NSR)=1.7. As can be seen in FIG. 2, there is insignificant urea conversion at liquid temperatures below 250 F. Between 300 and 400 F., urea conversion increased from about 20% to over 70%. Substantially all (i.e. more than about 90%) of the aqueous urea is converted to ammonia at reaction temperatures in excess of 500 F. The urea hydrolysis reactions are endothermic and require heat input.

The surprising result is that very high levels of urea conversion, typically 90% or more, were achieved in reaction times of less than 5 minutes at relatively moderate temperatures of 500 to 600 F. The prior art of Schell in U.S. Pat. No. 4,168,299 teaches in Col. 3, lines 14–63 that to hydrolyze substantially all (i.e. more than about 90%) of the aqueous urea using vanadia catalyst material, the temperature range should be from 70 C. to 200 C. (158 F. to 392 F.), most preferably from 90 C. to 160 C. (194 F. to 320 F.) with "a reaction time of at least about 10 minutes, preferably about 15 to 60 minutes, is desired for most applications." The more recent prior art of Schell in U.S. Pat. No. 4,220, 635 also teaches from Col. 3, line 19 to Col. 4, line 12 that to hydrolyze substantially all (i.e. more than about 90%) of the aqueous urea using vanadia catalyst material, the temperature range should be from 70 C. to 200 C. (158 F. to 392 F.), most preferably from 90 C. to 160 C. (194 F. to 320 F.) with "a reaction time of at least about 10 minutes, preferably about 15 to 360 minutes, is desired for most applications." It is significant that the more recent prior art of Schell in the '635 patent allows a much wider range of reaction times, including up to 6 hours, compared with the '299 patent which allows only up to about 1 hour.

There is nothing in the prior art of Schell to suggest that even if vanadia catalyst is used, the preferred embodiment of the urea hydrolysis process to achieve more than about 90% urea conversion would occur in a preferred temperature range from about 350 F. to 650 F. With the specific type of molybdenum catalyst tested in the example of FIG. 2, the process of the present invention hydrolyzes substantially all (i.e. more than about 90%) of the aqueous urea in less than about 5 minutes at a temperature preferably from 500 F. to 600 F. This temperature range clearly falls completely outside the prior art teaching of Schell.

Figure 3:
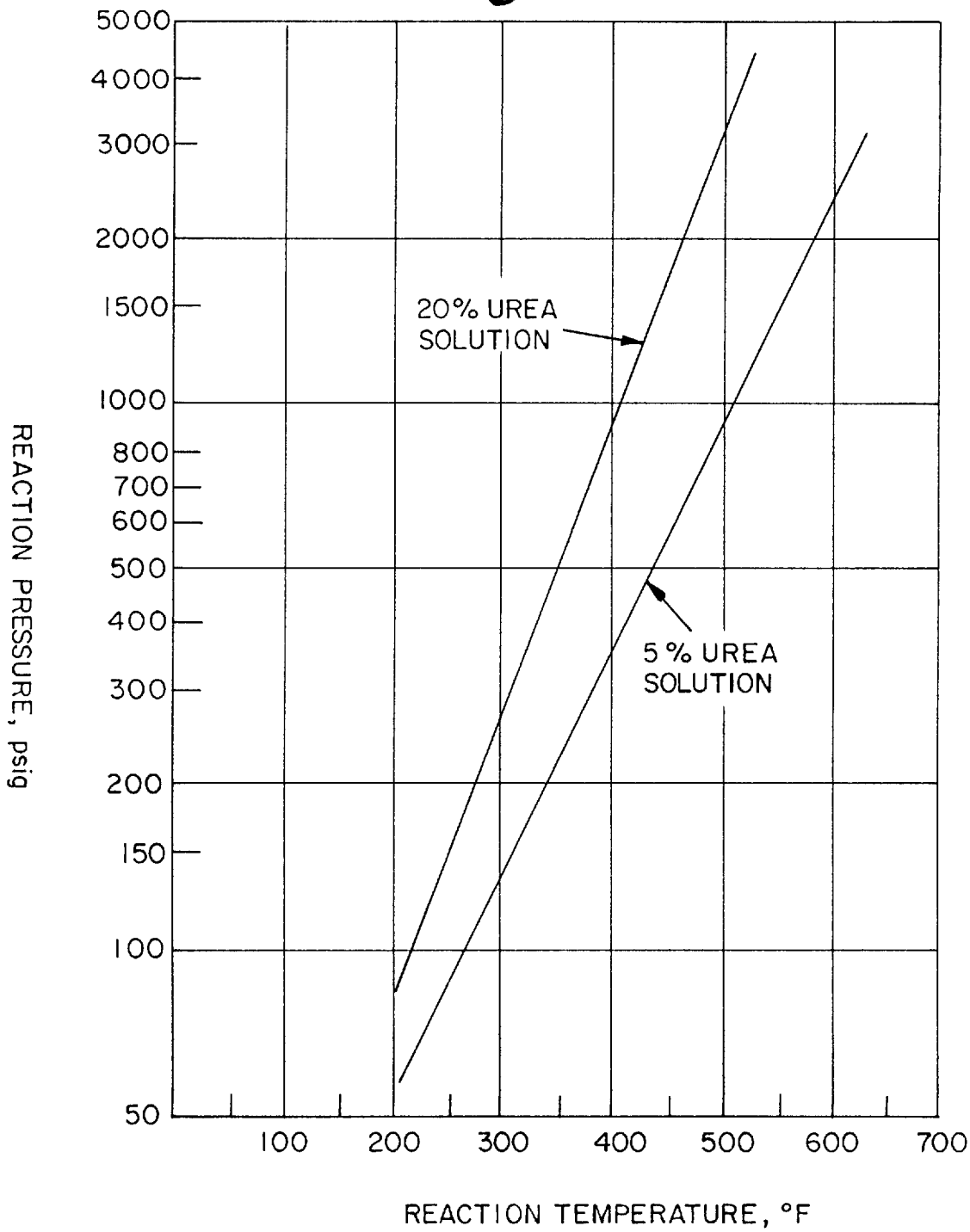
FIG. 3 Effect of Temperature on Required Pressure

It should be pointed out that the liquid pressure was increased as temperature was increased in order to keep all the reaction products, including ammonia, in the liquid phase. This is required to prevent two-phase flow through the conversion catalyst. The variation of required liquid pressure as a function of reaction temperature is shown in FIG. 3. Referring now to FIG. 3, it is seen that for reaction temperatures from 350 F. to 650 F., the required liquid pressure exceeds about 300 psig, and can be as high as about 2500 to 5000 psig, with higher pressures being required at higher solution concentrations. From the standpoint of a practical system, lower pressures are desired, and therefore urea solution concentrations of less than about 20% are preferred.

The urea conversion percentage was independently verified by analysis of liquid samples for $NH_3$ and total nitrogen content before and after the conversion catalyst. A typical result for the molybdenum catalyst as in FIG. 2, at a liquid temperature of 400 F. and a reaction time of 4.5 minutes is as follows:

EXAMPLE II

Nitrogen/Ammonia Analyses of Converted Liquid Samples

| Liquid Sample Description | $NH_3$ Content | Total $N_2$ Content | Calculated % Urea Conversion | |
|---|---|---|---|---|
| | | | Liquid Analysis $(NH_3/N_2)$ | Gas Analysis (FIG.2 @ 400 F.) |
| Urea Feed | 0.00% | 1.59% | 0% | 0% |
| Converted Urea | 0.73% | 1.28% | 57% | 62% |

In Example II, the 19% reduction in total $N_2$ content from urea feed to converted urea was believed due to escape of gaseous ammonia from the converted urea liquid sample prior to analysis. Taking this sampling error into consideration, it appears that the flue gas analysis and liquid sample analysis methods of determining percentage of urea conversion are in basic agreement. The flue gas analysis method compares the percentage ($N_2O/NOx$) measured when feeding urea into the SNCR DeNOx process with the result when feeding $NH_4OH$. This parameter is called ($N_2O/NOx$)base. The ($N_2O/NOx$) difference between urea and converted urea is then determined in the SNCR DeNOx process, and the result is called ($N_2O/NOx$)catalyst. The percentage urea conversion is then calculated as ($N_2O/NOx$) catalyst divided by ($N_2O/NOx$)base.

Having shown that surprising results could be obtained with molybdenum catalyst material, other catalysts were tested at a temperature of 350 F. to find whether a variety of catalysts can provide similar surprising results. The catalyst screening test results are provided below in Example III:

EXAMPLE III

Laboratory Combustor Results Using Several Types of Conversion Catalyst

Test Conditions
  Initial NOx=125 ppmv
  Flue Gas Temperature=1750 F.
  Chemical Flowrate (NSR)=2.0
  Catalyst Feed=2.4% Aqueous Urea
  Liquid Feed Pressure=300 psig
  Reaction Temperature=350 F.
  Reaction Time=3.5 minutes
  ($N_2O/NOx$)base=10.0%

| Catalyst Material | % Urea Conversion | % $NO_x$ Reduction | Byproduct $N_2O$ ($N_2O/NO_x$) | % Increased $CO/NO_x$ Ratio |
|---|---|---|---|---|
| Chromium | 80% | 38% | 4.0% | 0.0% |
| Molybdenum | 72% | 50% | 4.8% | 4.0% |
| Aluminum | 48% | 48% | 7.2% | 6.4% |
| Vanadium | 48% | 42% | 7.2% | 4.3% |
| Titanium | 40% | 52% | 8.0% | 2.4% |
| No Catalyst | 0% | 42% | 12.0% | 9.0% |

Note in Example III that all of the five (5) catalyst materials which were tested produced significant levels of urea conversion at 350 F., which is the lower end of the preferred 350 F. to 650 F. temperature range. Moreover, such results were obtained with a reaction time of only 3.5 minutes. These surprising results are clearly not anticipated by the prior art of Schell.

Of the five (5) catalyst materials tested, vanadium provided a urea conversion percentage on the lower end of the scale, i.e. 48% versus 72% for molybdenum and 80% from chromium. Again, based on the prior art of Schell, one skilled in the art would have thought that vanadium would have provided the highest level of urea conversion, and the results in Example III would not have been anticipated. It appears that a variety of active catalyst materials exist. Based on a comparison between the materials tested and the periodic table of the elements, the preferred conversion catalyst materials for practice of the present invention are materials selected from the group of metals, metal oxides, or metal compounds comprising aluminum, chromium, cobalt, molybdenum, niobium, titanium, tungsten, and vanadium.

There are many practical considerations to be taken into account when selecting the conversion catalyst material of choice. Depending on chemical composition, mixtures with other materials, and method of support on (and bonding to) a substrate structure, the conversion catalyst can have greater or lesser sensitivity to poisoning from impurities in the aqueous urea solution and greater or lesser tendency to enter the aqueous phase. Impurities in the water used to prepare the urea solution, such as arsenic, mercury, cadmium, or zinc (for example) can cause poisoning of the conversion catalyst. Lack of care to flush the conversion catalyst with clean water prior to shutdown can cause salt precipitation and plugging of the catalyst surfaces. The catalyst can be mechanically damaged it the pressure is suddenly released at high temperature, due to boiling and rapid release of vapor-phase components. It is expected that one skilled in the art would be able to design a suitable working system to overcome these (and other) typical problems, such as selecting materials of construction, proper design of a process control system, etc.

When considering practical process design configurations, an embodiment preferred when using catalyst having relatively high water solubility is compared with a simple once-through system in FIG. 4. Referring now to FIG. 4, the lower system having only four (4) elements is the once-through system. Urea solution is pressurized and heated using pump 1, followed by heat exchanger 2. The temperature of the urea solution is controlled by temperature control valve 3, which regulates steam supplied to heat exchanger 2 and controls urea solution temperature, as shown. Heated urea solution then passes through conversion catalyst 4, and pressurized ammonia solution is then discharged for use. Referring again to FIG. 4, the upper system has seven (7) elements and is the loop-type system. Elements 1 through 4 are the same. Pressurized ammonia solution is discharged through pressure relief valve 5 to flash drum 6, where ammonia vapor (along with $CO_2$ and $H_2O$) flashes from the liquid, and after passing through a liquid separator typical for flash drums, dry vapor is recovered from the top of flash drum 6 for use. Urea solution enters flash drum 6 through level control valve 7, used to maintain flash drum liquid level. The loop-type system is preferred for end uses requiring vaporized $NH_3$, where soluble components are retained in the liquid loop, and one or more soluble conversion catalysts could be utilized. There are many other possible loop-type configurations obvious to one skilled in the art which could maximize heat recovery, minimize equipment sizes, etc.

There are other types of preferred embodiments relating to the type of heating system used to heat the urea solution. For example, a heater which uses steam is shown in FIG. 4. Such a steam heating system would be a preferred embodiment for practice of the present invention in petrochemical and/or process plants where NOx control and/or ammonia recovery are suitable end uses. For example, in a urea manufacturing plant, steam is available and waste urea is contained in the form of aqueous solution. The waste urea can be recovered in the form of ammonia. If SCR or SNCR NOx control from any steam boiler is also required at the urea manufacturing plant, then another source of ammonia suitable for this purpose would also be available.

In addition to steam heaters, other types of heaters preferred for the practice of the present invention include fuel-fired heaters or electrically powered heaters.

Another type of heating system is preferred for exhaust flue gas NOx control applications. This preferred embodiment offers the advantage of heat recovery by using a portion of the exhaust flue gas heat at a location where the temperature is sufficiently high to provide an economical means of heating the urea solution. There are several preferred embodiments for this type of heating, depending on the NOx control application.

For boiler system flue gas NOx control applications, it is possible to use heat exchangers driven from heat sources such as steam, electricity, or fuel combustion. However, it is more desirable to heat the urea solution using hot flue gas at temperatures typically in excess of 600 F. in an appropriate furnace or ductwork location. This is usually at a location which is upstream from the outlet air preheating system. The advantage in this preferred embodiment is that flue gas heat which has been extracted can be recovered when the heated (and converted) urea is injected into the flue gas stream. For said boiler system applications using flue gas heat extraction for heating pressurized urea solution, there are two (2) preferred embodiments of the heat exchanger system for use with the present invention.

One embodiment uses non-retractable heat exchanger tubes located in the boiler flue gas stream, connected to a chemical injection system located outside the boiler flue gas stream. This embodiment is called the Fixed Heat Exchanger system.

Another embodiment uses one or more retractable lance (s) which incorporate both heat exchanging and chemical injection. This embodiment is called the Advanced Retractable Injection Lance (ARIL) system. Details showing one preferred embodiment of the ARIL system are shown in FIGS. 5 and 5a referring now to FIGS. 5 and 5a the pressurized aqueous urea solution 9 is introduced into the annular space between outer lance tube 1 and inner lance tube 2. Conversion catalyst 3 is located inside said annular space. Hot flue gas stream 4 is contained inside boiler wall 5. Urea solution 9 in said annular space is heated by hot flue gas stream 4 whenever retractable lance 6 is inserted through boiler wall 5. Retractable lance 6 is suitably designed to allow sufficient heating and sufficient reaction time for conversion catalyst 3 to change urea solution 9 into converted urea 10 during passage of the liquid solution through said annular space. Converted urea supply pipe 10 is an extension of inner lance tube 2, and provides high pressure converted urea solution to liquid nozzles 12, supported in the inner portion of retractable lance 6 using suitable supports (not shown).

Continuing in reference to FIG. 5 and 5a carrier gas 7, consisting of air, flue gas, steam or mixtures thereof, is supplied to the cold end of retractable lance 6 outside of boiler wall 5. In one embodiment, carrier gas 7 is preferably supplied at a pressure of at least 1.28 times the pressure of hot flue gas stream 4 to provide one or more suitable carrier gas jets 8 with sufficient jet momentum for effective penetration into hot flue gas stream 4. Converted urea 10 is supplied to one or more liquid nozzles 12 at sufficient pressure to prevent formation of gaseous ammonia prior to liquid nozzle orifices 12. One or more converted urea jets 11 formed at liquid nozzles 12 rapidly vaporize due to sudden pressure release combined with rapid heating from hot flue gas 4. Converted urea jets 11 are generally oriented along the centerline of carrier gas orifices 13. While converted urea 11 vaporizes, there is substantially no injected chemical contact with carrier gas orifices 13. This substantially avoids the formation of deposits or corrosion on jet orifice materials. The ARIL system produces one or more mixed jets 16 which can be spaced and oriented as desired to provide efficient mixing into the hot flue gas stream 4. In one preferred embodiment, jet offset angle 14 is between 60 and 180 degrees and retractable lance 6 is oriented with respect to direction of flue gas stream 4 to thereby provide penetration and distribution of chemical into hot flue gas stream 4 with mixed jets 16 issuing from both sidewalls of retractable lance 6.

It should be noted that retractable lance 6 can be retracted at any time without shutting down the boiler or otherwise losing temperature in hot flue gas 4. Such retraction capability allows access to ARIL system parts for any required operation, maintenance, adjustment, and testing purposes. In addition, such retraction capability allow use of two or more ARIL systems to be operated sequentially so that if the flue gas temperature becomes unfavorable, the affected ARIL system can be retracted and another ARIL system can be installed at a more favorable flue gas temperature location.

In another preferred embodiment of the ARIL system, conversion catalyst 3 is located outside boiler wall 5 and said annular space between outer lance tube 1 and inner lance tube 2 is only used for heating pressurized urea solution 9. In this embodiment, converted urea supply pipe 10 travels all the distance down the central zone of retractable lance 6 and exits through the sidewall of outer lance tube 1 outside boiler wall 5. Urea solution from this pipe, which has been heated during passage through said annular space, is then passed through a conversion catalyst located outside boiler wall 5. Converted urea is then supplied to a second pipe which enters through the sidewall of outer lance tube 1 outside boiler wall 5, and then travels back through the central zone of retractable lance 6. Said second pipe then provides high pressure converted urea solution to liquid nozzles 12, supported in the inner portion of retractable lance 6 using suitable supports (not shown). The advantage of this external conversion catalyst for the ARIL system is improved access for maintenance and capability for longer reaction times, if required. However, the physical size of the ARIL system becomes greater and integration into existing plants having restricted access space could be more difficult.

In another preferred embodiment of the ARIL system, ammonia is recovered as vapor by discharging high pressure converted urea liquid from supply pipe 10 into the central zone of the ARIL system. The ARIL system is supplied with carrier gas 7 which mixes with said ammonia vapor and causes the ammonia to be injected into hot flue gas stream 4 through one or more mixed jets 16.

Both the Fixed Heat Exchanger and ARIL system embodiments of the present invention preferred for boiler flue gas NOx reduction applications can be arranged either to directly inject high pressure urea conversion liquids, or to inject low pressure $NH_3$ vapor recovered from flash drum 6, as in the Loop-Type system of FIG. 4. It would be preferred in the latter case to inject said low pressure $NH_3$ vapor into the flue gas stream using air, recirculated flue gas, or mixtures thereof as a carrier gas to provide more complete and uniform mixing and distribution of $NH_3$ vapor into the cross-flowing flue gas stream.

In addition, both the Fixed Heat Exchanger and ARIL system embodiments of the present invention can be used in combination with a downstream NOx reduction catalyst, to provide SCR NOx reduction. However, only the ARIL system can provide both SNCR NOx reduction at the injection location and SCR NOx reduction using byproduct NH$_3$ slip from the upstream ARIL system. This byproduct NH$_3$ slip and remaining unreacted NOx enters into the downstream SCR NOx reduction catalyst where reduction of NOx and NH$_3$ slip can be maximized. The long flue gas path and residence time between the ARIL system and the SCR NOx reduction catalyst helps achieve relatively uniform concentrations of byproduct NH$_3$ slip and remaining unreacted NOx. This latter configuration is a preferred embodiment of the present invention in the case where very high levels of NOx removal may be required.

The above description of the present invention for urea conversion, including preferred embodiments for specific applications including both SNCR and SCR NOx reduction processes are for illustrative purposes. Because of variations which will be apparent to those skilled in the art, the present invention is not intended to be limited to the particular embodiments described above. The scope of the invention is defined in the following claims.

What is claimed is:

1. A process for converting an aqueous solution of urea to ammonia, the process comprising:
    a. heating an aqueous urea solution to a temperature of from 350° to 650° F. for producing urea reaction products;
    b. pressurizing the urea solution to a pressure of at least 300 psig, said pressure being sufficient to maintain the reaction products in the liquid phase; and
    c. while maintaining the temperature defined in part (a) and the pressure defined in part (b), contacting the urea solution for less than 10 minutes with a conversion catalyst selected from the group consisting of chromium, chromium oxide, chromium compounds, molybdenum, molybdenum oxide, and molybdenum compounds.

2. A process according to claim 1 wherein the aqueous urea solution is heated in a heat exchanger means, and said heat exchanger means recovers heat from flue gas or combustion exhaust gas which is hotter than 600° F.

3. A process according to claim 2 wherein said heat exchanger means comprises non-retractable heat exchanger tubes located in the hot flue gas or combustion exhaust gas stream.

4. A process for reducing N$_2$O and CO byproducts normally observed when an aqueous urea injection system is used for SNCR NOx reduction in combustion exhaust gas, the process comprising:
    a. heating an aqueous urea solution to a temperature of from 350° to 650° F. using a heat exchanger means, for producing urea reaction products;
    b. pressurizing the urea solution to a pressure of at least 300 psig, said pressure being sufficient to maintain the reaction products in the liquid phase;
    c. while maintaining the temperature defined in part (a) and the pressure defined in part (b), contacting the urea solution for a selected time with a conversion catalyst selected from the group consisting of chromium, chromium oxide, chromium compounds, molybdenum, molybdenum oxide, and molybdenum compounds, to provide a converted urea solution containing said urea reaction products; and
    d. injecting the converted urea solution into said combustion exhaust gas stream at temperatures from 1600° to 2000° F.

5. A process for recovering ammonia from an aqueous solution of urea, wherein more than 90% of the urea is converted to ammonia in a reaction time of less than 10 minutes, the process comprising:
    a. heating an aqueous urea solution to a temperature of from 350° to 650° F. using a heat exchanger means for producing urea reaction products, including ammonia;
    b. pressurizing the urea solution to a pressure of at least 300 psig, said pressure being sufficient to maintain the reaction products in the liquid phase;
    c. while maintaining the temperature defined in part (a) and the pressure defined in part (b), contacting the urea solution for less than 10 minutes with a conversion catalyst selected from the group consisting of chromium, chromium oxide, chromium compounds, molybdenum, molybdenum oxide, and molybdenum compounds, to thereby convert urea to ammonia; and
    d. recovering the ammonia.

6. A process according to claim 5 wherein said recovered ammonia is held in the liquid phase at elevated pressure, and thereafter the ammonia is infected into a combustion exhaust gas containing NOx to thereby achieve NOx reduction.

7. A process according to claim 6 additionally comprising the step of flowing the exhaust gas through an SCR NOx reduction catalyst to further reduce the amount of NOx in the exhaust gas stream.

8. A process for reducing NOx in a combustion exhaust gas stream from a boiler, the process comprising the steps of:
    a. in a heat exchanger, heating an aqueous urea solution to a temperature of from 350° to 650° F.;
    b. pressurizing the urea solution to the pressure required to keep urea reaction products in the liquid phase;
    c. contacting the urea solution for a selected time with a conversion catalyst selected from the group consisting of chromium, chromium oxide, chromium compounds, molybdenum, molybdenum oxide, and molybdenum compounds, to provide a converted urea solution; and
    d. injecting the converted urea solution into the boiler combustion exhaust gas.

9. A process according to claim 8 comprising recovering ammonia from the urea solution subsequent to its being contacted with the conversion catalyst.

10. A process for reducing NOx in a combustion exhaust gas stream from a boiler, the process comprising the steps of:
    a. heating an aqueous urea solution to a temperature of from 250° C. to 650° F.;
    b. pressurizing the urea solution to a pressure required to keep urea reaction products in the liquid phase;
    c. contacting the urea solution for a selected time with a conversion catalyst selected from the group consisting of chromium, chromium oxide, chromium compounds, molybdenum, molybdenum oxide, and molybdenum compounds, to convert urea to ammonia; and
    d. injecting the ammonia into the boiler combustion exhaust gas.

11. A process according to claim 10 wherein the recovered ammonia is mixed with a carrier gas prior to its injection into the combustion exhaust gas, the carrier gas selected from the group consisting of air, flue gas, steam, or mixtures thereof.

12. A process according to claim 11 additionally comprising the step of flowing the boiler combustion exhaust gas through an SCR NOx reduction catalyst located downstream from the ammonia injection location.

13. A process for converting an aqueous solution of urea to ammonia, the process comprising:

a. heating an aqueous urea solution in a heat exchanger comprising nonretractable heat exchanger tubes located in a hot flue gas or combustion exhaust gas stream to a temperature of from 350° F. to 650° F. in order to produce urea reaction products, including ammonia;

b. pressurizing the urea solution to a pressure of at least 300 psig, said pressure being sufficient to maintain such urea reaction products in the liquid phase; and c. while maintaining the temperature defined in part (a) and the pressure defined in part (b), contacting the urea solution for less than 10 minutes with a conversion catalyst selected from the group consisting of chromium, chromium oxide, chromium compounds, molybdenum, molybdenum oxide, and molybdenum compounds, thereby producing said urea reaction products.

14. A process for converting an aqueous solution of urea to ammonia, the process comprising:

a. heating an aqueous urea solution in a heat exchanger to a temperature of from 350° F. to 650° F. in order to produce urea reaction products, including ammonia, wherein such heating is provided by steam which has been heated in a hot flue gas stream;

b. pressurizing the urea solution to a pressure of at least 300 psig, said pressure being sufficient to maintain such urea reaction products in the liquid phase; and c. while maintaining the temperature defined in part (a) and the pressure defined in part (b), contacting the urea solution for less than 10 minutes with a conversion catalyst selected from the group consisting of chromium, chromium oxide, chromium compounds, molybdenum, molybdenum oxide, and molybdenum compounds, thereby producing said urea reaction products.

15. A process for converting an aqueous solution of urea to ammonia, the process comprising:

(a) heating an aqueous urea solution to a temperature of from 350° to 600° F. for producing urea reaction products;

(b) pressurizing the urea solution to a pressure of at least 300 psig; and (c) while maintaining the temperature defined in part (a) and the pressure defined in part (b), contacting the urea solution for less than 10 minutes with a conversion catalyst selected from the group consisting of chromium, chromium oxide, chromium compounds, molybdenum, molybdenum oxide, and molybdenum compounds.

16. A process according to claim 15, wherein the aqueous urea solution is heated in a heat exchanger, and said heat exchanger recovers heat from flue gas or combustion exhaust gas which is hotter than 600° F.

17. A process according to claim 16, wherein said heat exchanger comprises non-retractable heat exchanger tubes located in the hot flue gas or combustion exhaust gas stream.

18. A process for converting an aqueous solution of urea to ammonia, the process comprising:

(a) heating an aqueous urea solution to a temperature of from 350° to 650° F. for producing urea reaction products;

(b) pressurizing the urea solution to a pressure of at least 300 psig, wherein said pressure is sufficient to maintain the reaction products in the liquid phase; and (c) while maintaining the temperature defined in part (a) and the pressure defined in part (b), contacting the urea solution for less than 10 minutes with a conversion catalyst selected from the group consisting of aluminum, aluminum oxide, aluminum compounds, chromium, chromium oxide, chromium compounds, cobalt, cobalt oxide, cobalt compounds, molybdenum, molybdenum oxide, molybdenum compounds, niobium, niobium oxide, niobium compounds, titanium, titanium oxide, titanium compounds, tungsten, tungsten oxide, tungsten compounds, vanadium, vanadium oxide, and vanadium compounds.

* * * * *

UNITED STATES PATENT AND TRADEMARK OFFICE
CERTIFICATE OF CORRECTION

PATENT NO. : 5,827,490
DATED : October 27, 1998
INVENTOR(S) : Dale Gordon Jones

It is certified that error appears in the above-identified patent and that said Letters Patent is hereby corrected as shown below:

Abstract, lines 6, 7, delete "urea solution is pressurized to the pressure required to keep" (second occurrence).
Column 1, line 47, replace "2000 F." with -- 2000°F. --.
Column 2, line 33, replace "212 F." with -- 212°F.
Column 2, line 44, replace "215 F." with -- 215°F. --.
Column 2, line 48, replace "220 F." with -- 220°F. --.
Column 2, line 61, replace "400 F." with -- 400°F. --.
Column 3, line 7, replace "210 F." with -- 210°F.--.
Column 3, lines 17,18, replace "90 C. to 150 C. (or 190 F. to 300 F.)" with -- 90°C. to 150°C. (or 190°F. to 300°F.) --.
Column 3, line 22, replace "400 F." with -- 400°F. --.
Column 3, line 42, replace "350 F. to 650 F." with -- 350°F to 650°F --.
Column 4, lines 17, 25, replace "250 F." with -- 250°F. -- (both occurrences).
Column 4, line 46, replace "1920 F." with -- 1920°F. --.
Column 4, line 48, replace "450 F." with -- 450°F. --.
Column 5, line 6, replace "250 F." with -- 250°F. --.
Column 5, line 42, replace "450 F." with -- 450°F. --.
Column 6, line 3, replace "250 F. to over 90% at 500 F." with -- 250°F. to over 90% at 500°F. --.
Column 6, line 6, replace "1750 F." with -- 1750°F. --.
Column 6, line 9, replace "250 F. Between 300 and 400 F." with -- 250°F. Between 300° and 400°F. --.

UNITED STATES PATENT AND TRADEMARK OFFICE
CERTIFICATE OF CORRECTION

PATENT NO. : 5,827,490
DATED : October 27, 1998
INVENTOR(S) : Dale Gordon Jones

It is certified that error appears in the above-identified patent and that said Letters Patent is hereby corrected as shown below:

Column 6, line 11, replace "500 F." with -- 500°F. --.
Column 6, line 17, replace "500 to 600 F." with -- 500° to 600°F. --.
Column 6, lines 21, 29, replace "70 C. to 200 C. (158 F. to 392 F.)" with -- 70°C. to 200°C. (158°F. to 392°F.) -- (both occurrences).
Column 6, lines 22, 30, replace "90 C. to 160 C. (194 F. to 320 F.)" with -- 90°C. to 160°C. (194°F. to 320°F.) -- (both occurrences).
Column 6, line 41, replace "350 F. to 650 F." with -- 350°F. to 650°F. --.
Column 6, lines 45, 46, replace "500 F. to 600 F." with -- 500°F. to 600°F. --.
Column 6, line 55, replace "350 F. to 650 F." with -- 350°F. to 650°F. --.
Column 6, line 66, replace "400 F." with -- 400°F. --.
Column 7, line 9, replace "(FIG.2 @ 400 F.) with -- (FIG. 2 @ 400°F.) --.
Column 7, line 31, replace "350 F." with -- 350°F. --.
Column 7, line 40, replace "1750 F." with -- 1750°F. --.
Column 7, line 45, replace "350 F." with -- 350°F. --.
Column 7, line 61, replace "350 F." with -- 350°F. -- (both occurrences).
Column 7, line 62, replace "650 F." with -- 650°F. --.

UNITED STATES PATENT AND TRADEMARK OFFICE
CERTIFICATE OF CORRECTION

PATENT NO. : 5,827,490
DATED : October 27, 1998
INVENTOR(S) : Dale Gordon Jones

It is certified that error appears in the above-identified patent and that said Letters Patent is hereby corrected as shown below:

Column 9, line 22, replace "600 F." with -- 600°F. --.
Column 9, line 42, replace "5a referring" with -- 5a. Referring --.
Column 9, line 58, replace "FIG." with -- FIGS. --.

Signed and Sealed this

Fifteenth Day of February, 2000

Attest:

Q. TODD DICKINSON

*Attesting Officer*          *Commissioner of Patents and Trademarks*